May 27, 1952 — G. W. WINBERG — 2,598,630
BACK PRESSURE VALVE
Filed Feb. 27, 1945
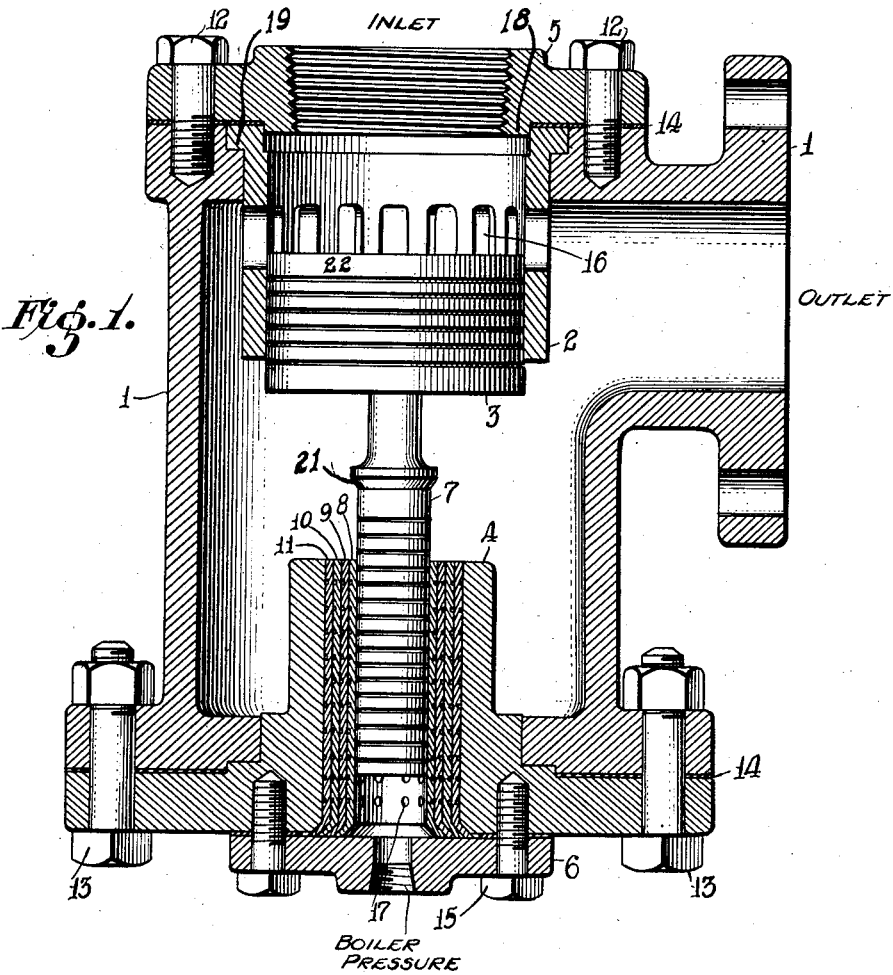
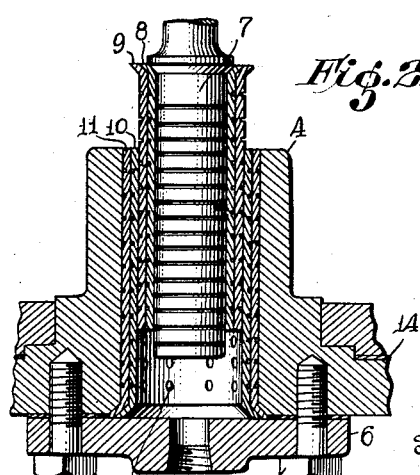
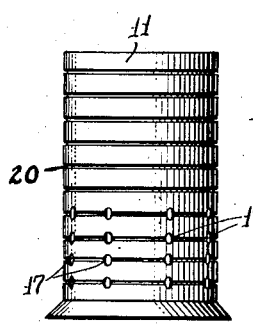
Inventor
Glen W. Winberg,
By Almon S. Nelson
Attorney Patented May 27, 1952

2,598,630

UNITED STATES PATENT OFFICE 2,598,630

BACK-PRESSURE VALVE

Glen W. Winberg, Gamboa, C. Z.

Application February 27, 1945, Serial No. 579,939

11 Claims. (Cl. 137—153)

1

This invention relating as indicated to a back pressure valve is more particularly directed to a valve of the piston type as distinguished from diaphragm valves, spring valves or weighted lever valves. It is, of course, old to provide back pressure valves but most of the prior constructions with which I am acquainted have certain disadvantages when placed in actual service which may be briefly summarized as follows:

The diaphragm type of valve is prone to wear out, thus requiring replacement. The same is true of the spring type of valve and both types of valves are relatively expensive when compared with my valve.

It is a particular object of the invention to provide a back pressure valve which may be constructed entirely of cast iron, thereby eliminating the use of strategic and expensive material and providing a relatively inexpensive valve.

It is a further object of the invention to provide a valve of the floating piston type wherein the piston is formed in two parts, each of which acts as a piston, the pressures on opposite piston heads controlling the particular location of the two part piston. As the back pressure increases upon one of the piston heads, it causes the composite piston to recede in a cage type of cylinder which is provided with ports. As the piston recedes, it uncovers just enough port area to maintain a constant back pressure regardless of the volume since there is an equalizing pressure upon the opposite end of the piston, such opposite end usually communicating with a boiler.

It is another object of the invention to provide the composite piston with one piston which I shall refer to as a balance piston, such balance piston being surrounded by a number of cylinder sleeves which are reversible. By reversing any desired number of the sleeves, the size of the piston head of the balance cylinder may be controlled so as to offset the effect of the back pressure on the main piston located at the opposite end of the composite piston.

A further particular object of the invention is to provide cylinder sleeves, which in one position form part of a cylinder and in inverted position form part of a piston to control the area of such piston head.

It is a further object of the invention to provide a back pressure valve with relatively few parts which may be easily assembled and disassembled and one when once assembled cannot be tampered with since all of the parts are enclosed in a valve casing.

2

The annexed drawings and the following description set forth in detail certain mechanism embodying the invention, such disclosed means constituting, however, but one of various mechanical forms in which the principle of the invention may be used.

The invention is exemplified in a back pressure valve shown in the accompanying drawings, in which the views are as follows:

Fig. 1 is a vertical section of my improved back pressure valve.

Fig. 2 is a partial vertical section, depicting the lower portion of Fig. 1, with certain of the cylinder sleeves reversed.

Fig. 3 is an elevation view of the cylinder sleeve.

Referring now to the drawings, and more particularly Fig. 1, it will be seen that my back pressure valve comprises a main casing 1, this casing being provided with a cylinder 2, the cylinder having an outwardly extending flange 19 seated in an annular recess located in the upper surface of the casing 1. A main piston 3 is slidably received in the cylinder 2 so that movement thereof opens and closes the ports 16 to provide communication between the inlet and outlet. A cylinder head 5 is secured to the casing 1 by means of cap screws 12, the cylinder head being provided with a boss 18 which fits down within the cylinder 2 thus holding the same firmly in place.

It is, of course, to be understood that the casing 1 may be in the form of a T or elbow and the parts may be reversed as desired; that is, the inlet may be lowermost, this, of course, depending upon the existing connections to which the back pressure valve is to be secured. The inlet to the valve is located at right angles to the outlet or outlets and this inlet is preferably provided with screw threads so that the same may be connected to a source of exhaust steam. It is to be noted that the cylinder head 5 may be removed to permit access to the piston to examine same or to remove the piston or piston ring 22 without disconnecting the valve casing from the line.

The outlet is preferably cast in the valve casing and is flanged so as to connect the casing to a line leading to the condenser or atmosphere or both.

The composite piston is formed of a main piston 3 located at the upper end thereof and a balance piston 7 which is received in a boss located centrally in the interior portion of the piston 3, this connection not being shown. The piston 3 is provided with a piston ring 22 which may be of the standard throttle type, this ring preventing blow by when the valve is closed. The piston 3 preferably has a solid head as in a power cylinder on its end which faces the inlet and the lower end of the piston is hollowed out to reduce the weight thereof by leaving a boss in the center for reception of the upper stem of balance piston 7.

Another cylinder 4 which I shall designate as a balance cylinder is located in the lower portion of the casing, this cylinder having an annular flange by means of which it is secured to the casing through the agency of head bolts 13. The cylinder 4 has slidably received therein a number of cylinder sleeves 8, 9, 10 and 11. It will, of course, be understood that more or less sleeves may be used, depending upon the particular installation. The balance cylinder 4 receives the balance piston 7, this piston being actuated by live steam upon its relatively small head area so as to equalize the exhaust pressure on the larger area of main piston 3. The size of cylinder 4, as well as the head area of balance piston 7, can be changed by reversing cylinder sleeves 8, 9 and 10. Stated in other words, these sleeves may be used as the cylinder wall when arranged as shown in Fig. 1. On the other hand, any number of the sleeves may be reversed, for example two as shown in Fig. 2. This reversal permits regulation of the back pressure on the exhaust line with any boiler pressure or steam from a reduced pressure line within relatively close limits. The balance cylinder 4 is counterbored at its lower end at an angle of approximately 45° so as to retain any of the balance cylinders when they are being used as part of the cylinder wall. The sleeves will, of course, be held in place when so used by balance cylinder head 6. The balance cylinder head 6 seals the outer end of the balance cylinder, in addition to holding the cylinder sleeves in place and it is preferably drilled and threaded for a 3-inch pipe so as to provide an inlet for the live steam that actuates balance piston 7.

The balance piston 7 is of such proportion that it slidably fits into the smallest cylinder sleeve 8 and is provided with a polished finish and steam grooves to prevent blow by. A shoulder 21 which is bevelled at approximately 45°, receives the bevelled portion of cylinder sleeve 8 when the same is inverted as shown in Fig. 2. Either one or all of the sleeves may be mounted in inverted position and the sleeves will be held tightly against the shoulder 21 by pressure of the steam in the balance cylinder.

The cylinder sleeves 8, 9, 10 and 11 permit increase or decrease of the area of the head of balance piston 7 so that when the back pressure valve is used on lower pressure live steam, the increased area will enable the balance piston to provide a push to maintain the desired back pressure on the auxiliaries and feed water heater. These cylinder sleeves are polished inside and out so as to fit nicely and slidably one within the other and also as to slide upon each other or the balance piston 7 itself or the wall of cylinder 4. These sleeves are preferably provided with grooves 20 and as a refinement, I prefer the provision of holes 17 as shown in the lowermost grooves. This permits the live steam to equalize between the sleeves at the lower end, thus preventing distortion of the sleeves when used with high pressure steam.

From the foregoing it will be seen that I have provided a back pressure valve which is composed of relatively few parts and which may be formed of cast iron or other relatively inexpensive non-strategic material.

Furthermore, it will be noted that the parts may be easily assembled and disassembled, and in addition, the composite piston may be easily removed without breaking the connections in the overall installation. In order to inspect the main piston 3, it is merely necessary to remove head 5, at which time the piston can be removed or if necessary, a new piston ring 22 can be inserted. Also, if it is desired to change the area of the head of the balance piston 7, it is merely necessary to remove head 6 and reverse the requisite number of cylinder sleeves. Finally, it will be observed that the unit when once assembled, cannot be tampered with so as to change the effect of the back pressure valve.

Of course, the invention is susceptible of various modifications without departing from the scope thereof as hereinafter claimed.

I claim:

1. In a back pressure valve, a valve casing, an inlet and an outlet in said casing and a cylinder mounted below said inlet, said cylinder being provided with ports whereby communication between said inlet and outlet may be controlled by movement of a piston in said cylinder; a second piston depending from said first piston and mounted to reciprocate in a second cylinder in said valve casing, a cylinder head mounted below said second piston and an inlet in said cylinder head providing communication to said second cylinder, said second piston being surrounding by a reversible cylinder sleeve.

2. In a back pressure valve, a valve casing, an inlet and an outlet in said casing and a cylinder mounted below said inlet, said cylinder being provided with ports whereby communication between said inlet and outlet may be controlled by movement of a piston in said cylinder; a second piston depending from said first piston and mounted to reciprocate in a second cylinder in said valve casing, a cylinder head mounted below said second piston and an inlet in said cylinder head providing communication to said second cylinder, said second piston being surrounded by a cylinder sleeve, said sleeve being reversible so as to move with said piston or become the inner wall of said second cylinder thus increasing or decreasing the area of the head of said second piston, means to cause said sleeve to be fixed with respect to said second cylinder in such first position and to move with said second piston when in such reversed position.

3. In a back pressure valve, a valve casing, an inlet and an outlet in said casing and a cylinder mounted below said inlet, said cylinder being provided with ports whereby communication between said inlet and outlet may be controlled by movement of a piston depending from said first piston and mounted to reciprocate in a second cylinder in said valve casing, a cylinder head mounted below said second piston and an inlet in said cylinder head providing communication to said second cylinder, said second piston being surrounded by a number of cylinder sleeves, there being means present to secure one or more of said sleeves as a part of said second cylinder.

4. In a back pressure valve, a valve casing, an inlet and an outlet in said casing and a cylinder mounted below said inlet, said cylinder being provided with ports whereby communication between said inlet and outlet may be controlled by movement of a piston in said cylinder; a second piston depending from said first piston and mounted to reciprocate in a second cylinder in said valve casing, a cylinder head mounted below said second piston and an inlet in said cylinder head providing communication to said second cylinder, said second piston being surrounded by a number of cylinder sleeves, there being means present to secure one or more of said sleeves as a part of said second cylinder, all of said sleeves being reversible to increase the area of the head of said second piston, means to cause said sleeve to be fixed with respect to said second cylinder in such first position and to move with said second piston when in such reversed position.

5. In a back pressure valve, a valve casing, an inlet and an outlet in said casing and a cylinder mounted below said inlet, said cylinder being provided with ports whereby communication between said inlet and outlet may be controlled by movement of a piston in said cylinder; a second piston depending from said first piston and mounted to reciprocate in a second cylinder in said valve casing, a cylinder head mounted below said second piston and an inlet in said cylinder head providing communication to said second cylinder, said second piston being surrounded by a number of cylinder sleeves, there being means present to secure one or more of said sleeves as a part of said second cylinder, all of said sleeves being reversible to increase the area of the head of said second piston, each of said sleeves comprising a cylinder having a smooth sliding fit with respect to an adjacent sleeve and the wall of said second cylinder and said second piston, and means to cause one or more of said sleeves to move with said second piston when reversed.

6. A cylinder sleeve adapted to be secured to the wall of a cylinder, said sleeve being reversible so that the same can be secured to a piston in said cylinder to increase the head area of said piston, said sleeve comprising a cylinder having an outwardly flaring portion at one end thereof.

7. A cylinder sleeve adapted to be secured to the wall of a cylinder said sleeve being reversible so that the same can be secured to a piston in said cylinder to increase the head area of said piston, said sleeve comprising a cylinder having an outwardly flaring portion at one end thereof, the outer surface of said sleeve being provided with steam grooves, there being radially disposed holes in said sleeve.

8. In apparatus of the character described, a valve casing, a cylinder mounted in the upper portion of said casing, said cylinder having an outwardly extending flange at its upper end, said flange being seated in an annular recess in said upper portion and a cylinder head secured to said casing and maintaining said flange seated in said recess, said cylinder having radially extending ports therein, a second cylinder secured to the lower portion of said casing by means including a cylinder head, both of said cylinders extending toward each other and into said casing and a common piston member having portions thereof mounted in each of said cylinders.

9. In apparatus of the character described, a valve casing, a cylinder mounted in the upper portion of said casing, said cylinder having an outwardly extending flange at its upper end, said flange being seated in an annular recess in said upper portion and a cylinder head secured to said casing and maintaining said flange seated in said recess, said cylinder having radially extending ports therein, a second cylinder secured to the lower portion of said casing by means including a cylinder head, both of said cylinders extending toward each other and into said casing, and a common piston member having portions thereof mounted in each of said cylinders, openings in each of said cylinder heads, the wall of said second cylinder being imperforate.

10. A back pressure valve comprising a casing provided with an inlet adapted to communicate with a source of pressure fluid and an outlet adapted to communicate with a region of lower pressure than said inlet pressure, a first cylinder mounted in the casing communicating with said inlet, said cylinder having a series of ports in its lateral wall and forming the sole means of communication between the inlet and the interior of the casing associated with the outlet, a piston in said cylinder controlling the effective area of said ports, said piston being subjected on one end to the pressure in said inlet and on its other end to the pressure in the interior of the casing, a second cylinder mounted in said casing having a diameter less than that of said first cylinder, a piston in said second cylinder secured to the piston in the first cylinder, an inlet for said second cylinder adapted to be connected to a source of pressure independent of said first-mentioned pressure fluid arranged to apply a force to the end of the second piston remote from the first piston and means disposed between the wall of the second cylinder and the piston adjustable to increase the inner diameter of the cylinder and the effective diameter of its associated piston.

11. A structure as defined in claim 10, said last named means comprising at least one sleeve reversible in said cylinder.

GLEN W. WINBERG.

REFERENCES CITED

The following references are of record in the file of this patent:

UNITED STATES PATENTS

| Number | Name | Date |
|---|---|---|
| 668,648 | Klipfel | Feb. 26, 1901 |
| 842,060 | Beaghan | Jan. 22, 1907 |
| 865,479 | Cooper | Sept. 10, 1907 |
| 1,101,920 | Garbutt | June 30, 1914 |
| 1,233,438 | Barengueras | July 17, 1917 |
| 1,309,891 | Griffith | July 15, 1919 |
| 1,496,391 | Thomas | June 3, 1924 |
| 1,532,788 | Vandervell | Apr. 7, 1925 |
| 1,584,407 | Thomas | May 11, 1926 |
| 1,604,428 | Veeder | Oct. 26, 1926 |
| 1,777,611 | Grohek | Oct. 7, 1930 |
| 1,860,484 | Shimer | May 31, 1932 |
| 1,896,098 | Poyer | Feb. 7, 1933 |

FOREIGN PATENTS

| Number | Country | Date |
|---|---|---|
| 495,422 | Great Britain | Nov. 14, 1938 |